UNITED STATES PATENT OFFICE.

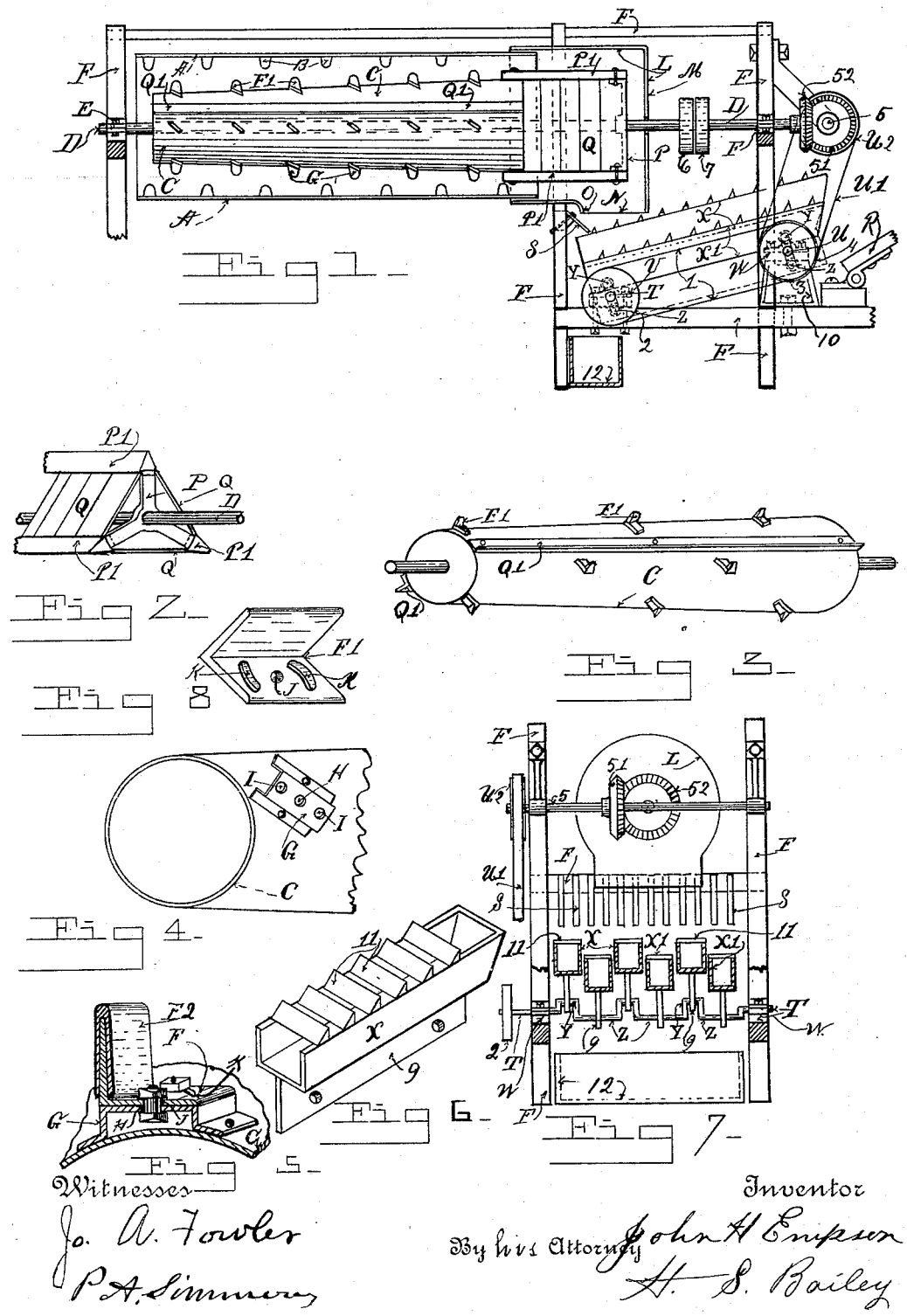

JOHN HOWARD EMPSON, OF LONGMONT, COLORADO.

PEA-SHELLING MACHINE.

SPECIFICATION forming part of Letters Patent No. 604,377, dated May 24, 1898.

Application filed February 4, 1897. Serial No. 621,978. (No model.)

*To all whom it may concern:*

Be it known that I, JOHN HOWARD EMPSON, a citizen of the United States of America, residing at Longmont, in the county of Boulder and State of Colorado, have invented certain new and useful Improvements in Pea-Shelling Machines; and I do declare the following to be a full, clear, and exact descrption of the invention, such as will enable others skilled in the art to which it appertains to make and use the same, reference being had to the accompanying drawings, and to the letters and figures of reference marked thereon, which form a part of this specification.

My invention relates to improvements in pea-shellers; and the objects of my invention are, first, to provide a new form of beater and means for changing and adjusting their pitch relative to the axis of the threshing-cylinder; second, to provide means for preventing the vines from winding around the cylinder; third, to provide means for preventing the threshed vines from winding around the cylinder's supporting-shaft at the point where they leave the threshing-cylinder and the concave; fourth, to provide an improved shaking or agitating device for separating any peas that may be carried from the threshing-cylinder with the threshed pea-vines. I attain these objects by the mechanism illustrated in the accompanying drawings, in which—

Figure 1 represents a partial longitudinal sectional view and side elevation of such parts of a threshing-machine as are necessary to illustrate my improvements. Fig. 2 represents a perspective view of my improved device for keeping the threshed vines from coiling around the cylinder's shaft; Fig. 3, a perspective view of the cylinder, showing the device I use for breaking the vines and thereby preventing them from winding around it; Fig. 4, a fragment of the cylinder, showing a washer riveted thereto, upon which the beaters are secured; Fig. 5, a sectional perspective view of a fragment of a beater and of its washer and the cylinder; Fig. 6, one of the pea-receiving troughs of the shaking device; Fig. 7, an end elevation of the discharging-hood of the cylinder and of the shaking and separating device, showing the shaking-trough in section near the bearing V; and Fig. 8, a perspective view of one of the beaters.

Similar letters and numerals of reference refer to similar parts throughout the several views.

Referring to Fig. 1, A designates the concave. It is provided with depending beaters B, which are secured to its interior surface.

C designates the cylinder. It is mounted on a shaft D, which has bearings in the boxes E, which are supported by the frame F, only a fragment of which is shown and only such other parts of the complete machine as are necessary to illustrate my improvement; but a complete pea-separating machine is illustrated and described in Patent No. 427,954, granted to me October 23, 1894. Upon the surface of the cylinder I secure several rows of beaters F', arranging them to pass between the beaters of the concave. I preferably arrange the beaters in straight rows across the cylinder, but can give them when desired a spiral arrangement, as shown in Fig. 3.

The form of beater I preferably use comprises a short piece of angle-iron, as shown in Fig. 8. One angle is covered with rubber $F^2$, as shown in Fig. 5, and forms the beater portion, and the other rests on a washer G, which is of a channel form in cross-section and is riveted to the surface of the cylinder at an angle to its axis corresponding approximately to the pitch I wish the beater to stand at. Through the top of this washer I form a central hole H and on each side of it a hole I. In all these holes I place bolts, allowing their heads to rest between the surface of the cylinder and the washer, as shown in Fig. 5. A hole J is made in the center of the base side of the angled beater and on each side of it a slot K, the three apertures being made to register with the bolts which extend through the washer. By means of this arrangement I am enabled to swivel the beaters on the bolts to stand at any pitch desired and to change the pitch of all the beaters on the cylinder in a very little while. Where pea-vines are very long, better results are obtained by giving the beaters a different pitch than when the vines are short. The pitch also governs largely the speed of the feed of the vines between the cylinder and the concave. Over the discharge end of the cylinder I place a hood L, the end M of which is closed, and the discharge-outlet N is formed by a short downward extension O at its under side. The cylinder's supporting-shaft extends through and beyond the hood; but between the end of the cylinder and the end of the hood it is necessary to cover the shaft to prevent the vines from coiling around the same and bunching up and thereby blocking the passage of the constantly-moving vines to the discharge-outlet. I preferably carry out this feature of my invention in the following manner: Upon the shaft and near the end of the hood I secure a spider-shaped casting P, which comprises a hub with three or more arms. The arms are made of the same diameter as the end of the cylinder, and to the arms of the spider I secure long beaters P', which at this point may be of any suitable form; but the angled form can be used, if desired. The opposite end of these beaters is secured to the end of the cylinder. I then build a housing around the shaft with boards Q, securing them in any convenient manner from one beater to the other, as shown in the fragmentary view of the device in Fig. 2. This arrangement is very simple and effective. The pea-vines also cause trouble in passing through the machine by winding around the cylinder. Especially is this the case where they are long and stocky. To obviate this, I place upon two or more points in the circumference of the cylinder and along its entire length a projecting rib Q', preferably made of angle-iron, one angle of which is riveted to the cylinder. The vines when discharged from the cylinder and hood are apt to carry concealed among them numbers of peas which it is very desirable should be separated from them and saved before the vines are carried away by the endless carrier R, a fragment of which is shown at the end of the frame. I preferably carry out this feature of my invention in the following manner:

Below the discharge-outlet of the hood and transversely across the outlet I arrange a rack of slats S to prevent the vines from falling back under the machine. Below the hood and extending outward from it in line with the cylinder I arrange upon two crank-shafts T and U, which are supported in boxes V and W, a plurality of troughs X and X'. The crank-shafts consist of from four to six oppositely-disposed cranks Y and Z, arranged in successive and alternate order, and each alternate crank is arranged diametrically opposite its adjacent crank. Both cranks are rotated in the same direction and time by a belt 1 and pulleys 2 and 3, which are of the same diameter and are placed on the ends of their respective crank-shafts T and U. The shaft U is belted by a belt U' from a pulley 4 at its end to a pulley U² on the end of the shaft 5. This shaft 5 extends transversely across the framework of the machine and has secured to it a bevel-gear 51, which meshes into a like gear 52 on the end of the cylinder-shaft D. Upon this shaft a tight pulley 6 and a loose pulley 7 are secured side by side, which are connected by belt to a source of power. Consequently when the power is applied to this shaft through these pulleys it is transmitted, through the bevel-gears and the pulleys and belts above mentioned, to the crank-shafts. The troughs are secured to the cranks by a depending rib 9 or other suitable means, and, owing to the alternate arrangement of the cranks, each alternate trough X' is at the point of its lowest respective crank throw and the adjacent troughs X are at the highest point of their respective cranks' throw. The troughs and cranks are set at an upward angle from the hood, the upper boxes W being raised above the frame by a chair 10. Across the top of the troughs I secure projecting angle-shaped strips 11 at a short distance apart, preferably from two to three times the diameter of a pea, and arrange them with the straight side of the angle toward the upper or outer end of the troughs. The upper end of each trough is closed, but the lower end is open, and a box 12 is placed under them to catch the peas as they roll out of them. In Fig. 6 I illustrate a perspective view of one of the troughs.

The operation of the shaking and agitating device is as follows: As the cranks are rotated each alternate trough is raised and the adjacent troughs are lowered in successive order, and as the cranks are rotated toward the upper end of the trough the vines as they feed from the hood upon them are hitched along toward the upper ends of the troughs by each revolution of each set of troughs through the medium of the angled cross-strips. They are also violently agitated, and the peas in them sift out and drop through the cross-strips into the troughs and run down into the box 12.
The vines finally feed off the troughs and drop onto the endless carrier R and are carried away.

Having described my invention, what I claim as new, and desire to secure by Letters Patent, is—

1. The combination with the cylinder and the concave, of a beater comprising a short piece of right-angled angle-iron having a rubber thimble secured to its vertically-disposed limb, channel-shaped washers secured to the threshing-cylinder or to the concave adapted for the said beaters to rest on, a hole through the center of said washer and a like hole on each side of it, a hole through the central portion of the opposite limb of said angle-iron beater and a concentric slot on each side of it arranged to register with the holes in said channel-shaped washer, and bolts, having their heads confined in the channel of said washer and projecting through the holes of said washer through the slots of said angle-iron whereby the said beater may be secured to said washer and adjusted on it at various angles to said washer and to the longitudinal axis of said threshing-cylinder, substantially as described.

2. The combination with the cylinder and the concave, of two crank-shafts having a plurality of oppositely-disposed cranks, troughs having a centrally-depending rib pivoted at each end to each similar disposed crank of each shaft and inclined upward away from said cylinder and positioned with their lower ends below and opposite the discharge-outlet of said cylinder and concave, and having their lower ends open and their upper ends closed, a plurality of right-angular-shaped strips secured transversely across the top of each trough at a space apart sufficient to allow the peas in the vines to drop between them into said trough, and positioned with one of the sides of the right angle toward the highest end of said troughs, with a bevel-gear on the end of said driving-shaft, a shaft journaled transversely to said driving-shaft, a bevel-gear thereon meshing with said first-named bevel-gear, suitable belt and pulley connections between said transverse shaft and one of said crank-shafts, and between the said crank-shafts, whereby they are caused to rotate with their cranks moving in unison and a portion of said troughs are thereby carried uniformly upward and the remainder uniformly downward in alternate order, substantially as described.

3. The combination with the cylinder and the concave, of a right-angle-shaped beater having a rubber-covered beating end, a bolt-hole through the center of its opposite end and a slot on each side of said hole and concentric to it, with a foundation-washer for said beater consisting of a channel-shaped member having its ends turned outward at approximately right angles to its sides and curved to fit and rest on the surface of said cylinder at an angle to its longitudinal axis, a centrally-arranged bolt-hole through its top registering with the center hole of said beaters, and similar bolt-holes on each side of said center bolt-hole registering with the slots in said beater and bolts adapted to said holes and slots, whereby said beater may be adjustably secured at any desired angle relative to said cylinder's axis on said washer, substantially as described.

In testimony whereof I affix my signature in presence of two witnesses.

JOHN HOWARD EMPSON.

Witnesses:
Jo. A. FOWLER,
P. A. SIMMONS.